US011698149B2

(12) United States Patent
Kornilovich et al.

(10) Patent No.: US 11,698,149 B2
(45) Date of Patent: Jul. 11, 2023

(54) MICROFLUIDIC VALVE

(71) Applicant: Hewlett-Packard Development Company, L.P., Spring, TX (US)

(72) Inventors: Pavel Kornilovich, Corvallis, OR (US); Alexander N. Govyadinov, Corvallis, OR (US); Viktor Shkolnikov, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 215 days.

(21) Appl. No.: 16/477,807

(22) PCT Filed: Feb. 15, 2017

(86) PCT No.: PCT/US2017/017968
§ 371 (c)(1),
(2) Date: Jul. 12, 2019

(87) PCT Pub. No.: WO2018/151721
PCT Pub. Date: Aug. 23, 2018

(65) Prior Publication Data
US 2020/0124207 A1 Apr. 23, 2020

(51) Int. Cl.
*B01L 3/00* (2006.01)
*F16K 99/00* (2006.01)

(52) U.S. Cl.
CPC .... *F16K 99/0017* (2013.01); *B01L 3/502738* (2013.01); *B01L 3/502784* (2013.01);
(Continued)

(58) Field of Classification Search
CPC .......... F16K 99/0017; B01L 3/502738; B01L 3/502784; B01L 2300/06;
(Continued)

(56) References Cited

U.S. PATENT DOCUMENTS 5,992,820 A 11/1999 Fare et al.
6,106,685 A 8/2000 McBride et al.
(Continued)

FOREIGN PATENT DOCUMENTS

EP 2572788 3/2013
JP 10110681 A * 4/1998 ............ F04B 43/043
(Continued)

OTHER PUBLICATIONS

Hagmeyer B. et al. Towards plug and play filling of microfluidic devices by utilizing networks of capillary stop valves. Biomicrofluidics, 2014, 8, 056501.
(Continued)

*Primary Examiner* — Matthew D Krcha
*Assistant Examiner* — Sophia Y Lyle
(74) *Attorney, Agent, or Firm* — Foley & Lardner LLP

(57) ABSTRACT

A microfluidic valve may include a first portion of a liquid conduit to contain a gas, a second portion of a liquid conduit to contain a liquid, and a constriction between the first portion and the second portion and across which a capillary meniscus is to form between the gas and the liquid. The microfluidic valve may further include a drop jetting device within the second portion to open the valve by breaking the capillary meniscus across the constriction.

16 Claims, 6 Drawing Sheets

(52) U.S. Cl.
CPC ... *B01L 2300/06* (2013.01); *B01L 2300/0627* (2013.01); *B01L 2300/1827* (2013.01); *B01L 2400/0688* (2013.01)

(58) Field of Classification Search
CPC ..... B01L 2300/0627; B01L 2300/1827; B01L 2400/0688; B01L 3/0268; B01L 2400/0439; B01L 3/502769; B01L 2200/0647; B01L 2300/0663; B01L 2400/0442; B01L 3/0241; B02L 2400/0439; F04F 5/24; F04B 19/24
See application file for complete search history.

(56) References Cited

U.S. PATENT DOCUMENTS

| | | | |
|---|---|---|---|
| 6,360,775 B1 * | 3/2002 | Barth | G02B 6/3538 |
| | | | 137/803 |
| 6,789,880 B2 | 9/2004 | Chou et al. | |
| 7,694,694 B2 | 4/2010 | Welle | |
| 2003/0215335 A1 * | 11/2003 | Crivelli | F04F 5/24 |
| | | | 417/53 |
| 2004/0258569 A1 * | 12/2004 | Yamazaki | B01F 13/0059 |
| | | | 422/514 |
| 2006/0002817 A1 * | 1/2006 | Bohm | F16K 99/0017 |
| | | | 422/400 |
| 2007/0280856 A1 * | 12/2007 | Ulmanella | B01L 3/502723 |
| | | | 422/400 |
| 2008/0038810 A1 * | 2/2008 | Pollack | G01N 15/1484 |
| | | | 435/283.1 |
| 2008/0185057 A1 * | 8/2008 | Prakash | B01L 3/502746 |
| | | | 137/594 |
| 2009/0012187 A1 | 1/2009 | Chu | |
| 2009/0308473 A1 * | 12/2009 | Shinoda | B01F 13/0062 |
| | | | 137/827 |
| 2010/0236927 A1 * | 9/2010 | Pope | B01L 3/502792 |
| | | | 204/600 |
| 2010/0270156 A1 * | 10/2010 | Srinivasan | B01F 33/3021 |
| | | | 204/450 |
| 2011/0168269 A1 * | 7/2011 | Den Toonder | F16K 99/0034 |
| | | | 422/504 |
| 2012/0196280 A1 * | 8/2012 | Karlsen | B01L 3/5027 |
| | | | 435/6.1 |
| 2013/0067993 A1 * | 3/2013 | D'Angelo | G01N 1/2208 |
| | | | 73/28.04 |

FOREIGN PATENT DOCUMENTS

| | | | | |
|---|---|---|---|---|
| WO | WO-2009126524 | | 10/2009 | |
| WO | WO-2014178827 A1 * | | 11/2014 | ........ B01L 3/502715 |
| WO | 2017180120 A1 | | 10/2017 | |
| WO | 2017184119 A1 | | 10/2017 | |

OTHER PUBLICATIONS

Miserendino, S. et al., Pressure-driven Microfluidics, (Research Paper), Micro/Nano Technology Systems for Biomedical Applications: Microfluidics, Optics, and Surface Chemistry, Mar. 25, 2010, pp. 121-195.

* cited by examiner

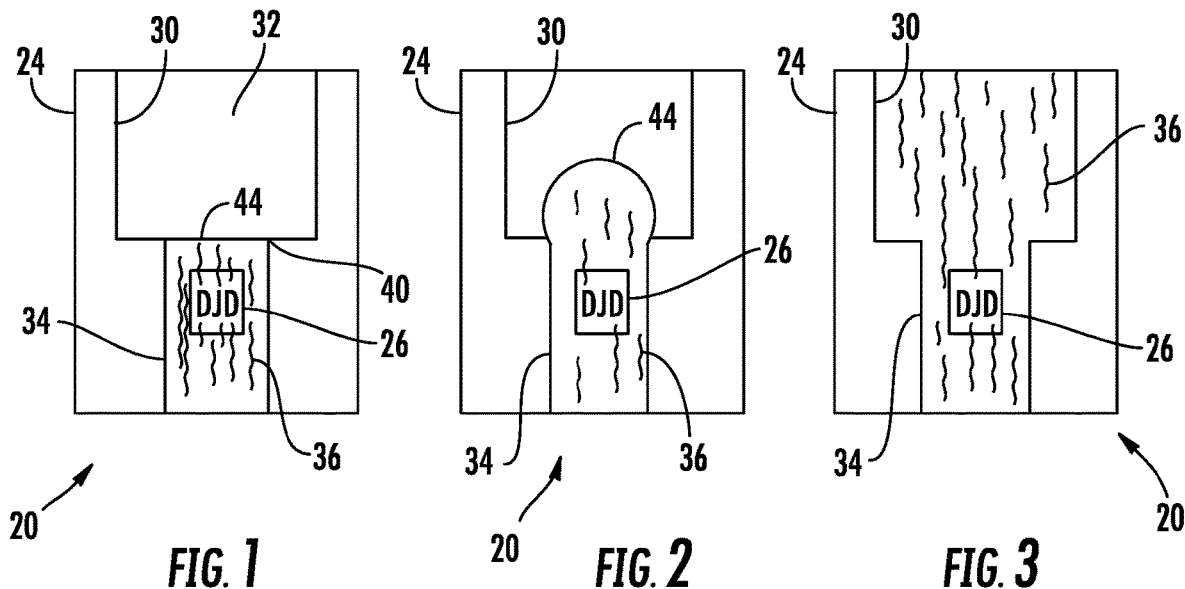
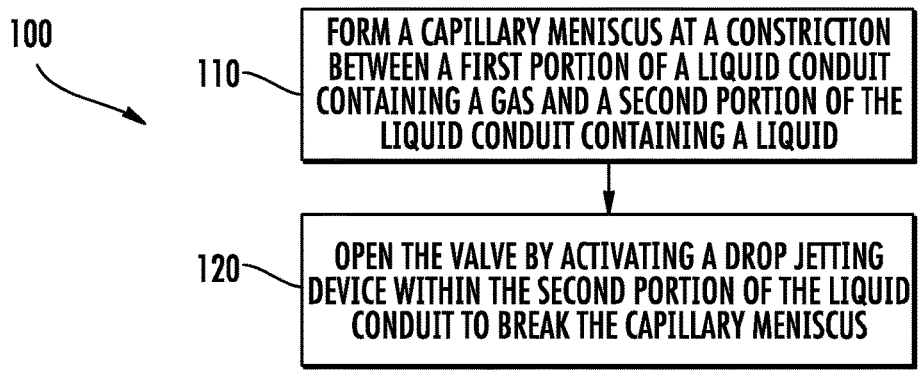

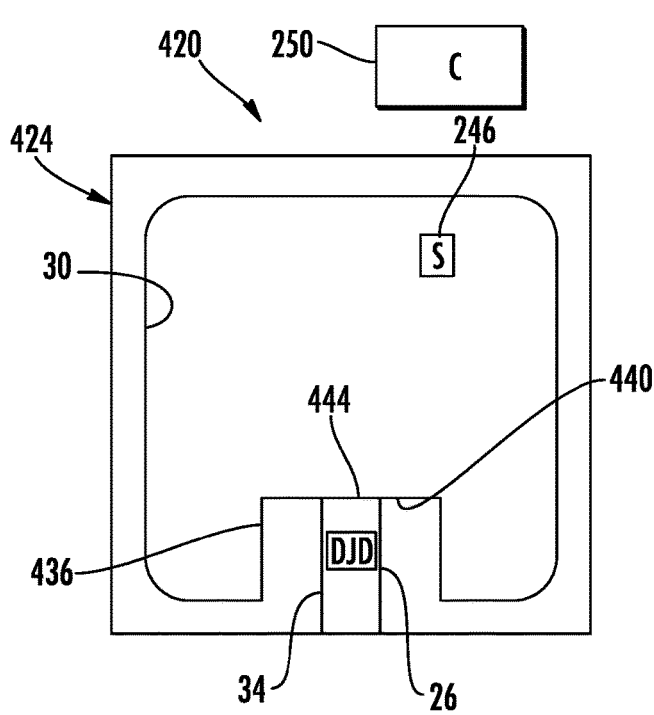
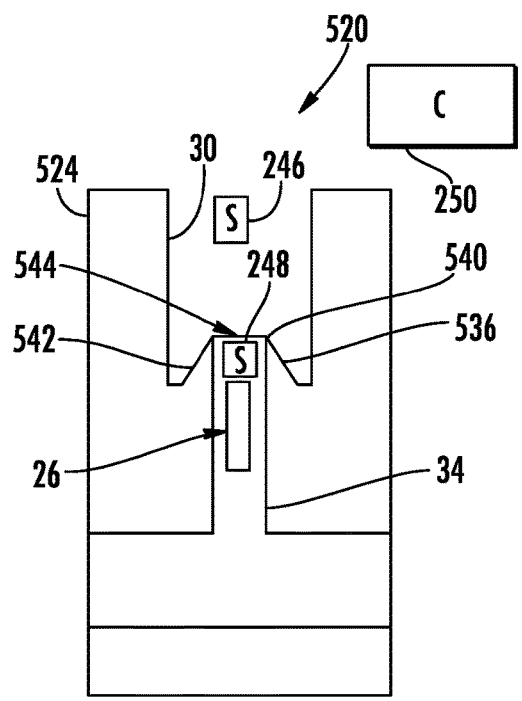
FIG. 7
FIG. 8
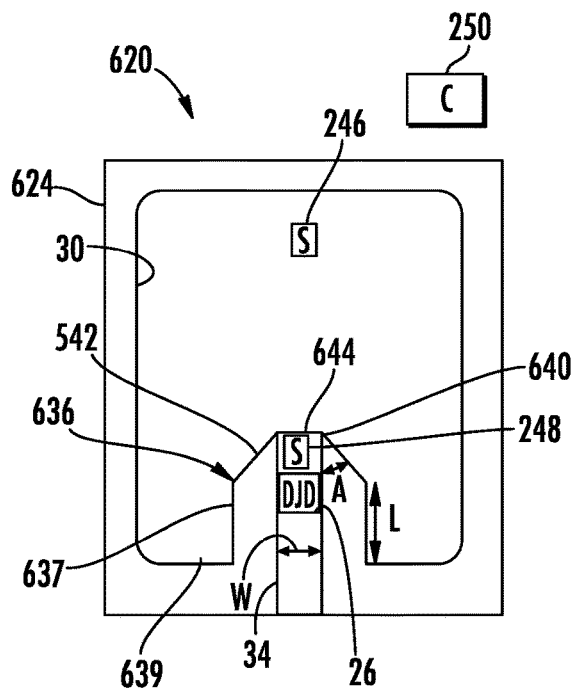
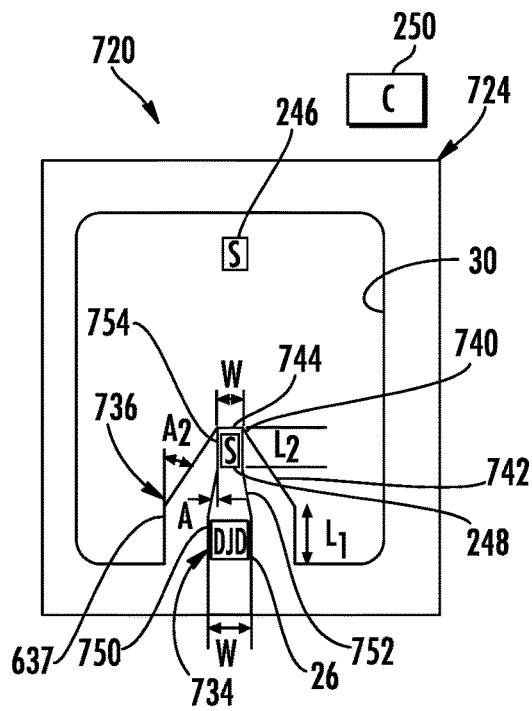
FIG. 9
FIG. 10

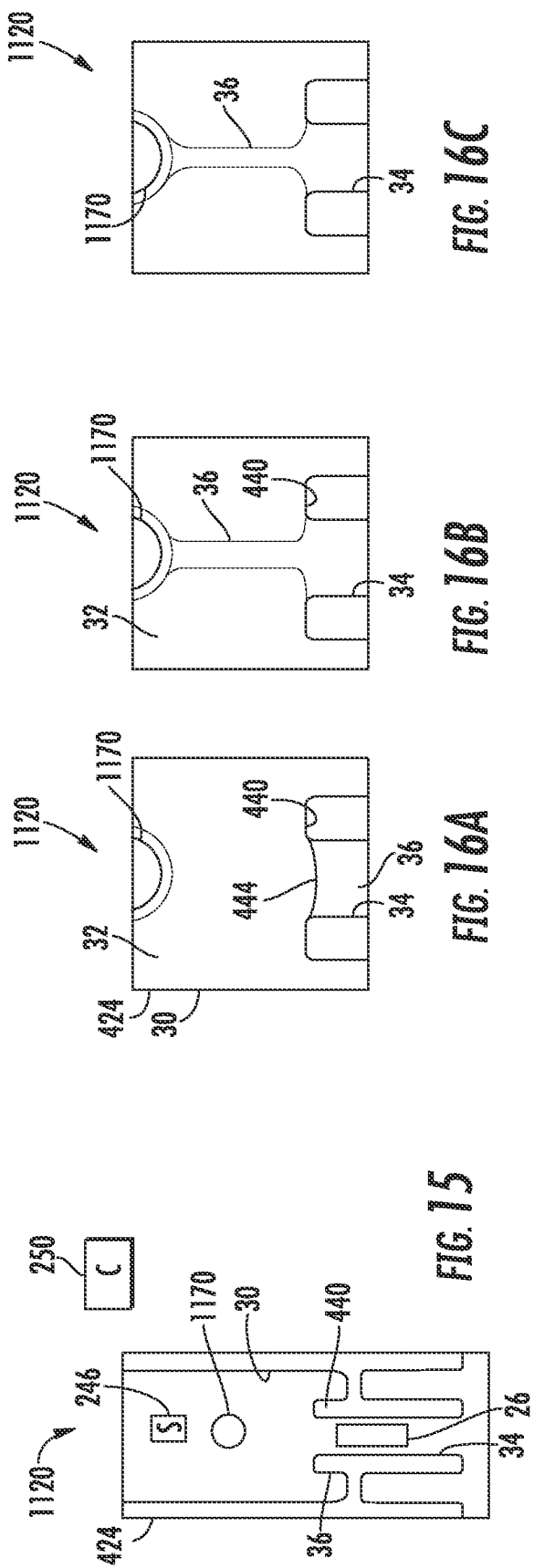
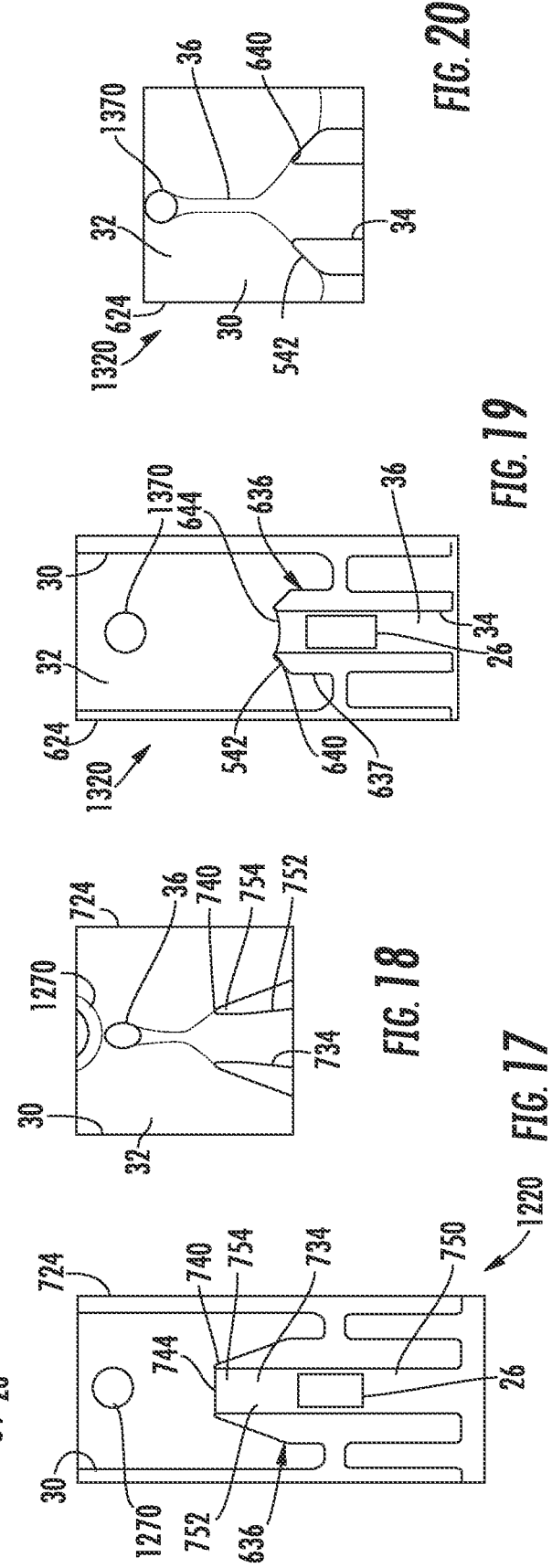

MICROFLUIDIC VALVE

BACKGROUND

Microfluidics technology has found many applications in the biomedical field, cell biology, protein crystallization and other areas. Such microfluidic technology may include microfluidic valves that control the passage of liquid through a conduit. The scale of microfluidics presents many design challenges with respect to such microfluidic valves.

BRIEF DESCRIPTION OF THE DRAWINGS

FIG. 1 is a schematic diagram of an example microfluidic valve in a closed state.

FIG. 2 is a schematic diagram of the microfluidic valve of FIG. 1 during opening of the valve.

FIG. 3 is a schematic diagram of the example microfluidic valve of FIG. 1 in an open state.

FIG. 4 is a flow diagram of an example method for operating a microfluidic valve.

FIG. 7 is a schematic diagram of another example microfluidic valve.

FIG. 8 is a schematic diagram of another example microfluidic valve.

FIG. 9 is a schematic diagram of another example microfluidic valve.

FIG. 10 is a schematic diagram of another example microfluidic valve.

FIG. 15 is a diagram of another example microfluidic valve.

FIGS. 16A, 16B and 16C are enlarged diagrams of a portion of the microfluidic valve of FIG. 15, illustrating opening of the valve.

FIG. 17 is a diagram of another example microfluidic valve.

FIG. 18 is an enlarged view of a portion of the microfluidic valve of FIG. 17 during opening of the valve.

FIG. 19 is a diagram of another example microfluidic valve.

FIG. 20 is an enlarged view of a portion of the microfluidic valve of FIG. 19 during opening of the valve.

DETAILED DESCRIPTION OF EXAMPLES

Figure 5:
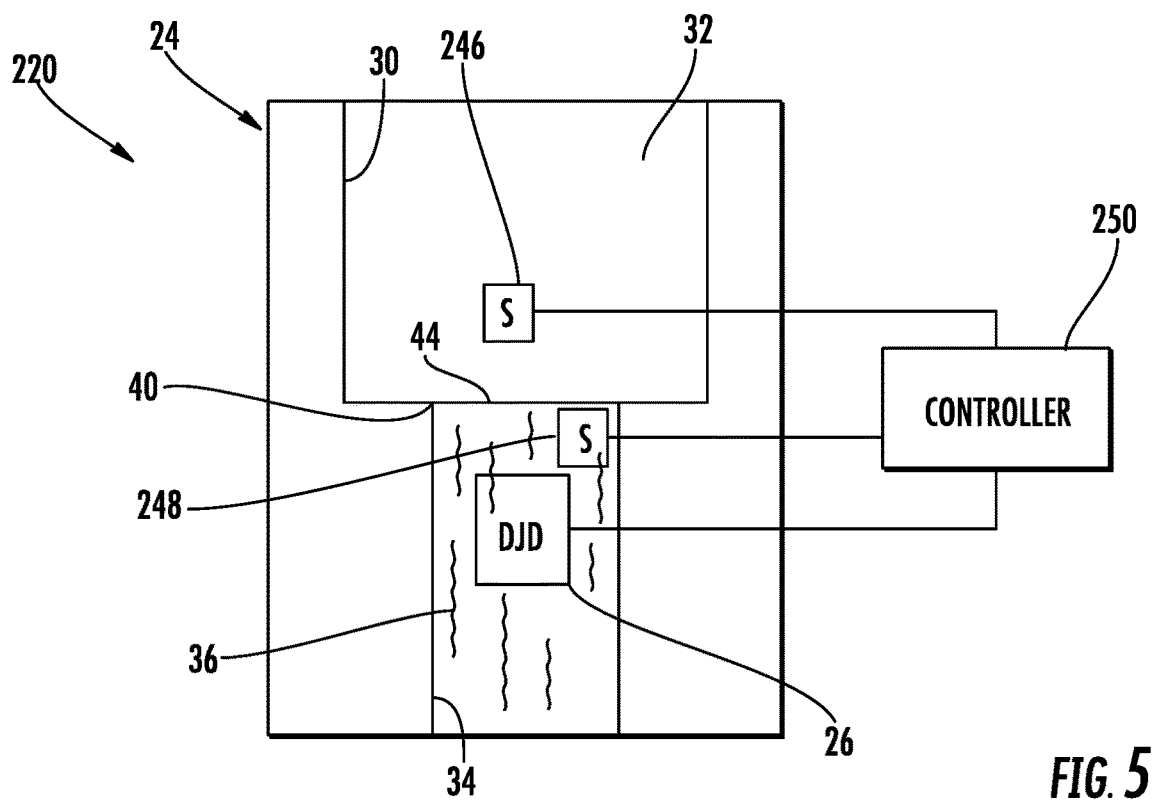
FIG. 5 is a schematic diagram of another example microfluidic valve.

Many microfluidic devices utilize valves that are miniaturized versions of macro-fluidic valves. As such, many existing microfluidic valves employ moving parts such as flexible flaps, membranes, free-flowing solid plugs and liquid discs. Such microfluidic valves are often unreliable and difficult to fabricate.

Disclosed herein are various example microfluidic valves that avoid much of the reliability issues and fabrication complexities found in many existing microfluidic valves. The disclosed microfluidic valves utilize a constriction in a conduit at an interface of a gas and a liquid such that a capillary meniscus forms between the gas and the liquid. The disclosed valves selectively open the conduit by breaking the capillary meniscus across the constriction with a drop jetting device.

Disclosed herein is an example method for operating a microfluidic valve. Pursuant to the method, capillary meniscus is formed at a constriction between the first portion of the liquid conduit containing a gas and a second portion of a liquid conduit containing a liquid. The valve is opened by activating a drop jetting device within the second portion of the liquid conduit to break the capillary meniscus.

Disclosed herein is an example microfluidic valve that utilizes a plurality of constrictions in series along microfluidic conduit. Each of the constrictions are sized such that a capillary meniscus may form at a gas-air interface existing at one of the constrictions. At least one drop jetting device is provided to break the capillary meniscus.

FIG. 1 illustrates an example microfluidic valve 20. Microfluidic valve 20 comprises a device for controlling the passage of a liquid through a conduit. Microfluidic valve 20 comprises a liquid conduit 24 and drop jetting device 26.

Conduit 24 comprises a body or structure having an interior along which liquid is to flow when valve 20 is open. Conduit 24 comprises a first interior or a first portion 30 that is to contain a gas 32 and a second interior or second portion 34 that is supplied with or is to contain a liquid 36. As shown by FIG. 1, portions 30 and 34 are joined or connected to one another at a constriction 40. A constriction is an interface where a conduit undergoes dimensional changes from a larger flow passage to a smaller flow passage.

Constriction 40 provides a structure at which a capillary meniscus may form. Because the constriction 40 is formed between or along a gas-liquid interface between the two portions 30, 34 of conduit 24, capillary meniscus 44 may form across constriction 40. This capillary meniscus 44 serves as a valve to stop liquid flow through conduit 24. Actuation or opening of this valve provided by capillary initiative 44 may occur through breaking of the capillary meniscus 44.

Drop jetting device 26 comprises a device that creates a temporary burst in pressure or multiple bursts in pressure sufficient to break the capillary meniscus 44 and open valve 20. FIGS. 2 and 3 illustrate the opening of valve 20 by drop jetting device 26. As shown by FIG. 2, drop jetting device 26 is activated or fired at least once to create a burst in pressure or multiple bursts of pressure that expand meniscus 44 into conduit 30. As shown by FIG. 3, upon generation of a sufficient increase in pressure through the generation of at least one burst by drop jetting device 26, capillary meniscus 44 bursts or breaks, releasing the flow of liquid 36 across constriction 40 into portion 30 of conduit 24. Continued flow of the liquid 36 fills up portion 30, inhibiting the reestablishment of a meniscus across constriction 40. With sufficient pressure and continued supply of liquid, liquid 36 continues to flow through portions 30 and 34 of conduit 24 without interruption.

In one implementation, drop jetting device 26 comprises a device that creates a burst of high pressure or a high-pressure pulse. In one implementation, the high-pressure pulse has a duration of 1 to 10 μs. In one implementation, drop jetting device 26 is to create multiple bursts of high pressure or multiple high pressure pulses which expand and burst capillary meniscus 44 towards and into portion 30 of conduit 24.

In one implementation, drop jetting device 26 comprises a liquid displacement device in the form of a thermal resistor, wherein the thermal resistor creates a quickly expanding vapor bubble, that pushes through or pushes adjacent liquid through meniscus 44 to break meniscus 44. In one implementation, a thermal resistor comprises an electrically resistive element along portion 34 of conduit 24, wherein the thermal resistor applies sufficient amounts of heat to raise the temperature of the adjacent liquid to above a nucleation temperature of the liquid so as to vaporize portions of the adjacent liquid to create the expanding vapor bubble. In another implementation, drop jetting device 26 comprises a thermal resistor that applies heat so as to heat the adjacent liquid to a temperature below its nucleation temperature, but to a temperature at which gas or air within the liquid forms the expanding bubble.

In yet another implementation, drop jetting device 26 comprises a piezo-resistive element and a membrane along portion 34 of conduit 24. The application of electric current across the piezo resistive element causes the piezo resistive element to change shape, moving the membrane to displace liquid with a sufficient pressure so as to burst capillary meniscus 44. In one implementation, the location of drop jetting device 26 is such that drop jetting device 26 does not initially serve as an inertial pump, but is sufficiently close to constriction 40 such that the first of pressure, whether a bubble or volume of liquid, breaks through meniscus 44.

FIG. 4 is a flow diagram of an example method 100 for operating a microfluidic valve. Method 100 facilitates the control over the flow of fluid through a conduit in a microfluidic device with enhanced reliability and with a valve that may have fewer fabrication complexities. Although method 100 is described as being carried out with microfluidic valve 20 described above, it should be appreciated that method 100 may likewise be carried out with any of the microfluidic valves described hereafter or with other similar microfluidic valve constructions.

As indicated by block 110, a capillary meniscus, such as meniscus 44, is formed at a constriction, such as constriction 40, between a first portion 30 of a liquid conduit 24 containing a gas 32 and a second portion 34 of a liquid conduit 24 containing a liquid 36. As indicated by block 120, the valve 20 may be opened by activating a drop jetting device 26 within the second portion 34 of conduit 24. The drop jetting device may be actuated at least once so as to break the capillary meniscus 44, permitting the liquid to flow into and fill the first portion 30 of conduit 24. As a result, the valve 20 is opened and the liquid may flow through conduit 24.

FIG. 5 is a schematic diagram of another example microfluidic valve 220. Microfluidic valve 220 is similar to microfluidic valve 20 described above except that microfluidic valve 220 additionally comprises sensors 246, 248 and controller 250. Those remaining components of valve 220 which correspond to components of valve 20 are numbered similarly.

Sensors 246, 248 comprise sensing devices that output signals from which controller 250 may determine the state of valve 220. In one implementation, sensors 246, 248 comprise sensing devices that output signals from which controller 250 may determine whether meniscus 44 exists or has been broken or whether liquid is flowing through constriction 40, i.e. the valve is open.

Sensor 246 is located within portion 30 of conduit 24. In one implementation, sensor 246 is located flush or along a floor, ceiling or sidewall of portion 30 of conduit 24 to reduce obstruction of flow when valve 220 is opened. In one implementation, sensor 246 may comprise a wet-dry sensor that senses the presence or absence of liquid. For example, in one implementation, sensor 246 may comprise spaced electrodes of a circuit, wherein the circuit completed within a liquid extending across and contacting the spaced electrodes. In such an implementation, a dry state may indicate that valve 220 is presently closed, that meniscus is intact and that no liquid is flowing through valve 220. A wet state would indicate the presence of liquid across sensor 246, indicating that meniscus 44 has been broken and that valve 220 has been opened. In other implementations, sensor 246 may comprise other sensing devices, such as a flow sensor which senses the rate at which fluid or liquid is flowing across sensor 246.

Sensor 248 is located within portion 34 of conduit 24, upstream of portion 30, on an opposite side of meniscus 44 when valve 220 is closed. In one implementation, sensor 248 is located flush or along a floor, ceiling or sidewall of portion 34 of conduit 24 to reduce obstruction of flow when valve 220 is opened. In one implementation, sensor 248 is located proximate to constriction 40 so as to detect the flow of liquid through constriction 40. In one implementation, sensor 248 may comprise a flow sensor that senses whether liquid is flowing or moving within portion 34 of conduit 24. In some implementations, sensor may comprise an impedance sensor that senses the flow of liquid through portion 34. In some implementations, sensor 248 may have dual functions: sensing the flow of liquid through conduit 34 and sensing the number or count of cells or particles flowing through portion 34 of conduit 24 of the rate at which cells or particles carried in the liquid are flowing through portion 34 of conduit 24. In such implementations, sensor 248 (schematically illustrated) may extend across the width of conduit 34 such that particles or cells cannot flow around such a sensor without being counted.

Although sensors 246, 248 are depicted in the illustrated locations, sensor 246, 248 may be provided at other locations in the respective portions 30 and 34 of conduit 220. In some implementations, portion 30 may contain multiple spaced sensors 246. In some implementations, portion 34 may contain multiple spaced sensors 248. In some implementations, one or both of sensors 246, 248 may be omitted.

Controller 250 comprises actuation logic or electronics that control the actuation of drop jetting device 26. Such actuation logic or electronics may comprise integrated circuitry, application specific integrated circuitry or a processing unit that controls the operation of drop jetting device 26. For purposes of this application, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Unless otherwise specifically noted, the controller is not limited to any specific combination of hardware circuitry and software, nor to any particular source for the instructions executed by the processing unit.

Controller 250 controls drop jetting device 26 at least partially based upon signals from sensor 246 and/or sensor 248. Controller 250 receives signals from sensor 246 and/or sensor 248 and determines whether valve 220 is in an open state or a closed state. In response to signals from a user or other controlling source requesting opening of valve 220, controller 250 may output control signals actuating drop jetting device 26. Based upon signals from sensor 246 and/or sensor 248, controller 250 may determine whether the actuation of the drop jetting device 26 resulted in the breaking of meniscus 44 and the opening of valve 220. In response to determining that valve 220 remains occluded or closed by meniscus 44, controller 250 may output further control signals repeating the actuation of drop jetting device 26. This cycle may be repeated until controller 250 receives signals that indicate that valve 220 has been opened.

In some implementations, rather than repeatedly actuating or firing dropped and device 26 until valve 220 has been opened, controller 250 may alternatively utilize signals from sensor 246 and/or sensor 248 to determine an adjustment for drop jetting device 26 so as to open valve 220. For example, based upon signals from sensor 246 and/or sensor 248, controller 250 may determine a change in an operational parameter for drop jetting device 26, wherein controller 250 may output control signals adjusting the operational parameter such that actuation of drop jetting device 26 by controller 250 results in valve 220 being opened. For example, controller 250 may adjust the power or displacement characteristics of drop jetting device 26 so as to produce a higher pressure burst or higher amplitude pulse sufficient to break meniscus 44 and open valve 220 with a single actuation or with fewer actuations of drop jetting device 26.

Figure 6:
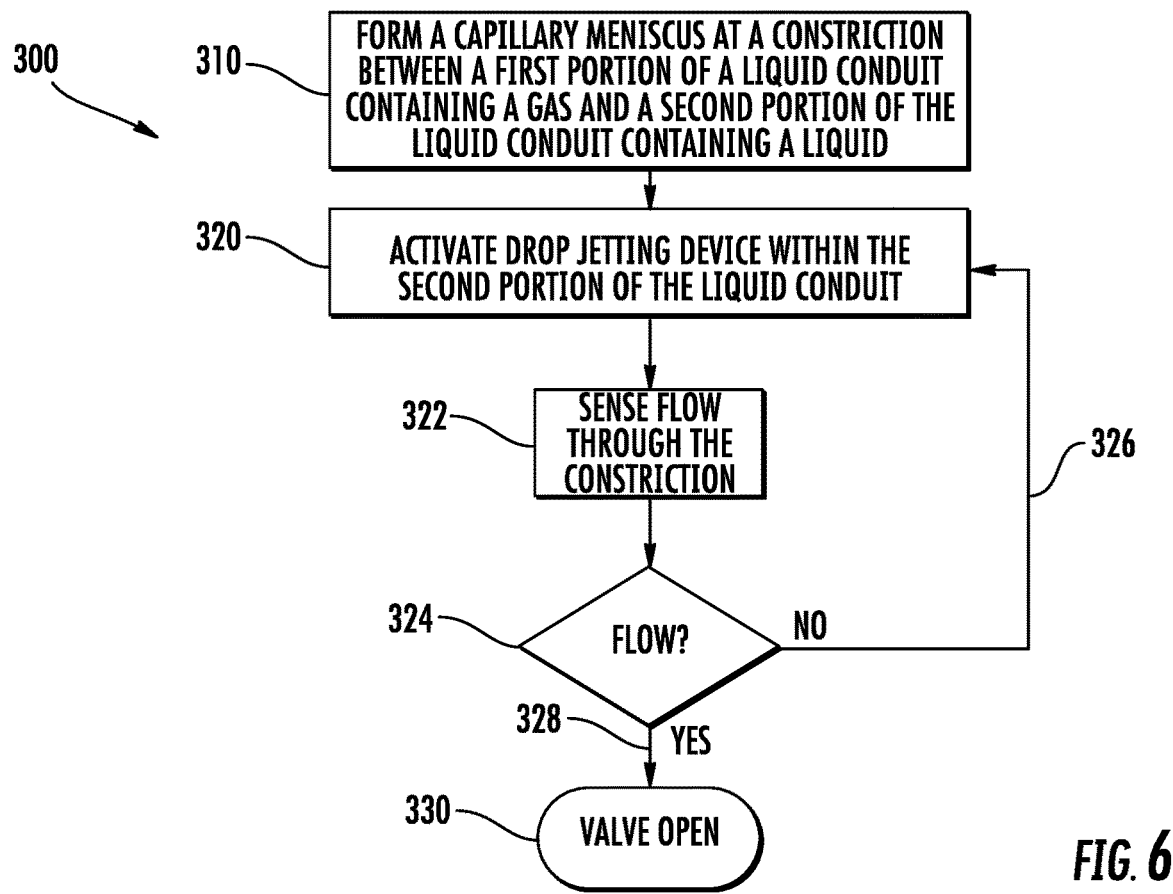
FIG. 6 is a flow diagram of another example method for operating a microfluidic valve.

FIG. 6 is a flow diagram of an example method 300 that may be utilized by controller 250 to operate a microfluidic valves such as valve 220. Although method 300 is described with respect to valve 220, it should be appreciated that method 300 may be carried out by any controller in a similar microfluidic valve 220 having at least one valve state indicating sensor.

As indicated by block 310, a capillary meniscus 44 is formed at a constriction, such as constriction 40, between a first portion, such as portion 30, of a liquid conduit containing a gas and a second portion, such as portion 34, of the liquid conduit containing a liquid. The capillary meniscus 44 blocks or occlude the flow of liquid across constriction 40, closing the microfluidic valve.

As indicated by block 320, controller 250 activates drop jetting device 26 within portion 34 of conduit 24. As indicated by block 322, flow through the constriction 44 is sensed. For example, sensors 246, 248 may provide closed-loop feedback to controller 250 indicating whether liquid is presently flowing across or through constriction 40 or facilitating such a determination by controller 250.

As indicated by block 324, controller 250 utilizes signals from sensor 246 and/or sensor 248 to determine whether liquid is presently flowing across constriction 40. For example, in one implementation, the sensed presence of liquid at sensor 246 may indicate the flow of liquid across constriction 40. The flow of liquid across sensor 248 may indicate the flow of liquid across constriction 44.

As indicated by arrow 326, in response to determining that liquid is not presently flowing across constriction 40, controller 250 once again activates drop jetting device 26. In one implementation, the supplemental or additional actuations of drop jetting device 26 may be similar to prior actuations of drop jetting device 26. In other implementations, supplemental or additional actuations of drop jetting device 26 may have adjusted operational parameters or settings as compared to the prior actuation or actuations of drop jetting device 26. For example, controller 250 may adjust the actuation of drop jetting device 26 to gradually increase the frequency and/or amplitude of the subsequent pulses are bursts to effectuate bursting or breaking of meniscus 44 and opening of valve 220. As indicated by arrow 328 and block 330, upon determining that flow has been established across constriction 44 based upon signals from sensor 246 and/or sensor 248, controller 250 may conclude that valve 220 has been opened.

FIG. 7 schematically illustrates an example microfluidic valve 420. Microfluidic valve 420 is similar to microfluidic valve 220 described above except that microfluidic valve 420 is specifically illustrated as comprising a conduit 424 comprising a spout 436. Those remaining components of microfluidic valve 420 which correspond to portions of microfluidic valve 220 are numbered similarly or are shown in FIG. 5.

Spout 436 projects into an interior of portion 30, forming constriction 440 that serves as the outlet of portion 34 into portion 30. As shown by FIG. 7, a liquid-gas interface is formed by a capillary meniscus 444 across constriction 440. The capillary meniscus 444 blocks or occludes the flow of fluid from portion 34 into portion 30 when valve 420 is in the closed state.

Drop jetting device 26 is located within those portions of spout 436 that lie within the larger interior of portion 30. Drop jetting device 26 is sufficiently close to constriction 440 such that drop jetting device 26 may create a burst of pressure or a pressure pulse sufficient to expand and break capillary meniscus 444 to open valve 420. In one implementation, drop jetting device 26 is formed along a floor, ceiling or sides of the interior of spout 436 so as to not interfere with the flow of liquid through the interior of spout 436 into portion 30 when valve 420 is in an open state.

FIG. 8 schematically illustrates another example microfluidic valve 520. Microfluidic valve 520 is similar to microfluidic valve 420 described above except that microfluidic valve 520 is specifically illustrated as comprising a conduit 524 comprising a spout 536. Those remaining components of microfluidic valve 520 which correspond to portions of microfluidic valve 520 are numbered similarly.

Spout 536 is similar to spout 436 in that spout 536 projects into an interior of portion 30, providing a constriction 540 that serves as the outlet of portion 34 into portion 30. As shown by FIG. 8, a liquid-gas interface is formed by a capillary meniscus 544 across constriction 540. The capillary meniscus 544 blocks or occludes the flow of fluid from portion 34 into portion 30 when valve 520 is in the closed state. Unlike spout 436, spout 536 has tapering or pointed sidewalls 542 extending about constriction 540. The tapering or pointed shape of sidewalls 542 results in capillary meniscus having a higher retention pressure or higher burst pressure threshold. As a result, capillary meniscus 544 is less likely to inadvertently burst or break, resulting in inadvertent or unintentional opening of valve 520.

Drop jetting device 26 is located within those portions of spout 536 that lie within the larger interior of portion 30. Drop jetting device 26 is sufficiently close to constriction 540 such that drop jetting device 26 may create a burst of pressure or a pressure pulse sufficient to expand and break capillary meniscus 544 to open valve 520. In one implementation, drop jetting device 26 is formed along a floor, ceiling or sides of the interior of spout 536 so as to not interfere with the flow of liquid through the interior of spout 536 into portion 30 when valve 520 is in an open state.

FIG. 9 schematically illustrates another example microfluidic valve 620. Microfluidic valve 620 is similar to microfluidic valve 520 except that microfluidic valve 620 comprises spout 636 in place of spout 536. Like spout 536, spout 636 has a tapering or pointed sidewalls 542 adjacent to and about constriction 640 across which the capillary meniscus 644 may form. In contrast to spout 536, spout 636 projects further into portion 30 of conduit 424. Spout 636 additionally comprises an extension portion 637 extending between pointed sidewalls 542 and a rear surface 639 of portion 30 of conduit 624.

In the example illustrated, extension portion 637 has a length L of 30 μm. In one implementation, pointed sidewalls 542 extending at an angle A of 30°, whereas portion 34 adjacent to constriction 640 and containing drop jetting device 26 has a width W of 30 μm. In other implementations, such portions of microfluidic valve 620 may have other dimensions.

FIG. 10 schematically illustrates another example microfluidic valve 720. Microfluidic valve 720 is similar to microfluidic valve 620 except that microfluidic valve 720 comprises spout 736 in place of spout 636 so as to have a conduit portion 734 instead of conduit portion 34. Like spout 636, spout 736 has a tapering or pointed sidewalls 742 adjacent to and about constriction 740 across which the capillary meniscus 744 may form. In contrast to spout 636, spout 736 has varying interior dimensions along its length leading to constriction 740. The interior of spout 736, providing portion 734 of conduit 724 comprises a main portion 750, tapering or funneling portion 752 and jetting portion 754.

Main portion 750 has substantially uniform dimensions along its length leading to constricting portion 752. In the example illustrated, drop jetting device 26 is formed along or within main portion 750. Constricting portion 752 extends between main portion 750 and jetting portion 754. Constricting portion 752 has a reduced cross-sectional area as compared to main portion 750. In the example illustrated, the cross-sectional area or width of constricting portion gradually narrows in a sloped fashion from main portion 750 to jetting portion 754. In other implementations, constricting portion 752, having a rectangular cross section, may reduce in width (or diameter with circular cross-sections) between main portion 750 and jetting portion 754 in a stepwise manner or a curved or parabolic manner.

Jetting portion 754 comprises a narrow region of portion 734 of conduit 724 extending between constricting portion 752 and constriction 740. Jetting portion 754 comprise the region of portion 734 through which the pressure pulse or burst created by drop jetting device 26 is accelerated towards constriction 740 to enhance breaking of capillary meniscus 744. In one implementation, jetting portion 754 contains sensor 248 proximate to constriction 740.

In the example illustrated, extension portion 637 has a length L1 of 30 μm and a width W of 30 μm, jetting portion 754 has a length L2 of 20 μm. Constriction 740 has a width of 10 μm. Constricting portion 752 tapers at an angle A1 of 15° while pointed sidewalls 742 taper at an angle A2 of 60°. In other implementations, spout 736 may have other dimensions.

Figure 11:
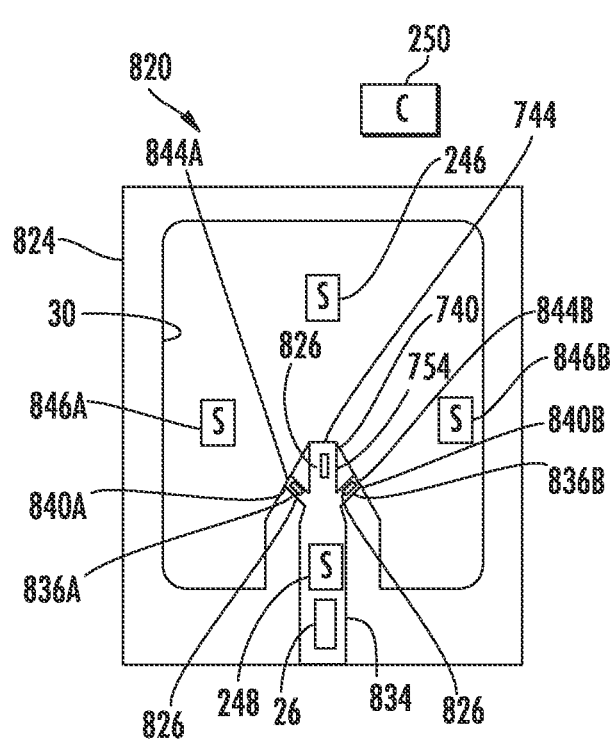
FIG. 11 is a schematic diagram of another example microfluidic valve

FIG. 11 schematically illustrates microfluidic valve 820. Microfluidic valve 820 is similar to microfluidic valve 720 except that microfluidic valve 820 comprises portion 834 in place of portion 734 and additionally comprises sensors 846A, 846B (collectively referred to as sensors 846). Those remaining components of microfluidic valve 820 which correspond to components of valve 720 are numbered similarly.

Portion 834 of conduit 824 is similar to portion 734 of conduit 724 except a portion 834 comprise two additional side passages 836A, 836B (collectively referred to as passages 836) which form constrictions 840A and 840B, respectively. Constrictions 840A and 840B (collectively referred to as constrictions 840) comprise end portions of passages 836 adjoined to wider regions of portion 30. A liquid-gas interface forms along constrictions 840 so as to form capillary meniscus 844A and 844B across constrictions 840A and 840B, respectively. As a result, microfluidic valve 820 has three constrictions 740, 840A, 840B and three formed capillary menisci 744, 844A and 844B in parallel. The three constrictions 740, 840A and 840B provide smaller fluid passages to provide capillary menisci having greater or higher burst pressure thresholds while at the same time providing a higher rate of liquid flow into portion 30 once valve 820 is opened.

In the example illustrated, drop jetting device 26 is sufficiently close to constrictions 740, 840A and 840B and is operable to provide sufficiently strong bursts or pulses of sufficient pressure so as to concurrently burst or break each of the capillary menisci of the three constrictions 740, 840A and 840B. In other implementations, valve 820 may comprise multiple drop jetting devices 826 (shown in broken lines) that individually and selectively break associated menisci. For example, in one implementation, separate and independently actuatable drop jetting device 826 may be located in each of jetting portion 754 and side passages 836, wherein actuation of the respective drop jetting device bursts the capillary meniscus of the associated constriction. In such an implementation, valve 820 may be initially partially opened when less than all of the menisci have been burst and subsequently fully opened in response to subsequent actuation of the remaining drop jetting devices or in response to portion 30 sufficiently filling with liquid such that the liquid-gas interface at the other constrictions no longer exist.

Sensors 846 are similar to sensor 246 described above. Sensors 846 are located within portion 30 and are generally opposite to constrictions 840A and 840B. Sensors 846 output signals from which controller 250 may determine the state of menisci 844A and 844B. Based upon signals from sensor 846, controller 250 may determine what portions of valve 820 have been opened and may accordingly adjust the operation of drop jetting device 26 (or drop jetting devices 826 in some implementations). In some implementations, additional sensors may be provided within jetting portion 754 as well as side passages 836 to indicate the status of the capillary menisci. In some implementations, such sensors may be omitted.

Figure 12:
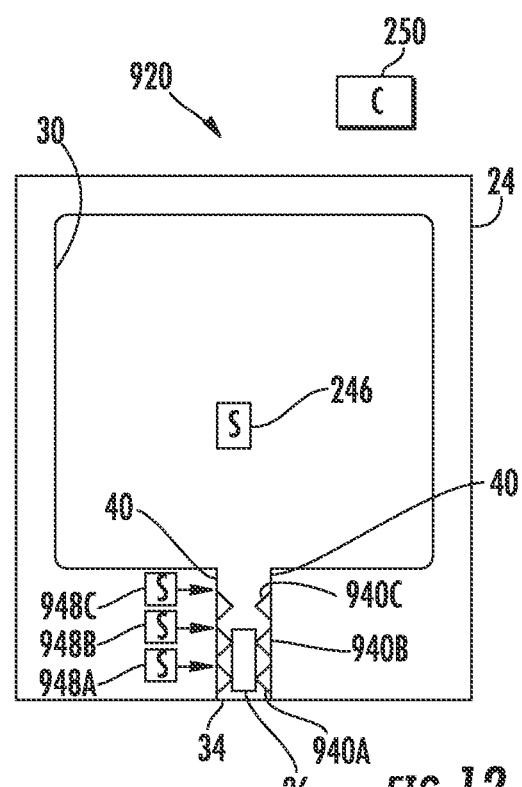
FIG. 12 is a schematic diagram of another example microfluidic valve.

FIG. 12 schematically illustrates microfluidic valve 920. Microfluidic valve 920 is similar to microfluidic valve 220 described above except that microfluidic valve 920 additionally comprises constrictions 940A, 940B, 940C (collectively referred to as constrictions 940) and sensors 948A, 948B and 948C (collectively referred to as sensors 948). Those remaining components of microfluidic valve 920 which correspond to components of microfluidic valve 220 are numbered similarly.

Constrictions 940 comprise narrowing regions arranged in series within portion 34. Constrictions 940 provide multiple successive regions where the capillary meniscus may be formed at a liquid-gas interface along portion 34, closing valve 920. In one implementation, such multiple constrictions 940, arranged in series, assist in reducing the likelihood of accidental or inadvertent opening of valve 920 due to pressure fluctuations or variations in either of portions 30 or 34.

In one implementation, a liquid-gas interface is formed at constriction 940A, forming a capillary meniscus across constriction 940A, wherein the capillary menisci across constriction 40A closes valve 920. In the event of inadvertent breaking or bursting of the capillary meniscus across constriction 940A, liquid may flow through constriction 940A and form a second capillary meniscus across constriction 940B, once again closing valve 920. In the event of inadvertent breaking or bursting of the capillary missed is across constriction 940B, liquid may flow through constriction 940B and form a third capillary meniscus across constriction 940C, once again closing valve 920 and inhibiting the flow of liquid into portion 30.

In the example illustrated, each of such constriction 940 has a width of less than or equal to 20 μm in one implementation, less than or equal to 10 μm. Although constriction 940 are illustrated as being similar in size such that the capillary menisci formed across such constrictions have substantially similar burst pressure thresholds, the pressure at which such capillary menisci would break, in other implementations, constrictions 940 may be differently shaped or differently sized such that the different constrictions 940 result in different capillary menisci having different bursts or break pressure thresholds. For example, in one implementation, the different restrictions 940 may be differently shaped or differently sized so as to provide capillary menisci having ever-increasing burst pressure thresholds as the constrictions 940 approach portion 30. Although valve 920 is illustrated as comprising three such constriction 940 in portion 34, in other implementations, about 920 may have a greater or fewer of such supplemental constrictions 940.

In the example illustrated, drop jetting device 26 is situated sufficiently close to each of such constrictions 940 so as to create pressure burst or pressure pulses in the liquid that are near the liquid-gas interface so as to burst each capillary meniscus that forms across the different constrictions 940. In one implementation, drop jetting device 26 may be sequentially fired or actuated multiple times, once for each constriction 940 and its associated capillary meniscus. In other implementations, drop jetting device may be fired or actuated a single time for a sufficient duration so as to break each of the capillary menisci that sequentially form across the constrictions 940 or inhibit the formation of such capillary menisci once the initial capillary meniscus has been broken.

Sensors 948 are similar to sensor 246 described above. In the example illustrated, sensor 948A is located within or along portion 34 between constrictions 940A and 940B. Sensor 948B is located within or along portion 34 between constrictions 940B and 940C. Constriction 948C is located within or along portion 34 between constrictions 940D and 40. Each of such sensors 948 output signals that facilitate the determination of the state of liquid flow in a particular volume by controller 250.

Based upon signals from sensor 948A, controller 250 may determine whether a capillary meniscus is present at constriction 940A. For example, in implementations where sensor 948A comprise a wet-dry sensor, a dry state indicated by sensor 948A may indicate the presence of a capillary meniscus at constriction 940A, whereas a wet state may indicate that any such capillary meniscus previously extending across constriction 940A has been broken. Based upon signals from sensors 948A and 948B, controller 250 may determine whether the capillary meniscus is present across constriction 940B. Based upon signals from sensors 948A, 948B and 948C, controller may determine whether a capillary meniscus is present across constriction 948C. Based upon signals from such sensors 948, controller 250 may ascertain the risk of microfluidic valve 920 being accidentally opened. Based upon signals from sensors 948, controller 250 may determine whether drop jetting device 26 should be actuated additional times or should be actuated to provide greater pulse pressure so as to break all of the capillary menisci and completely open valve 920.

Figure 13:
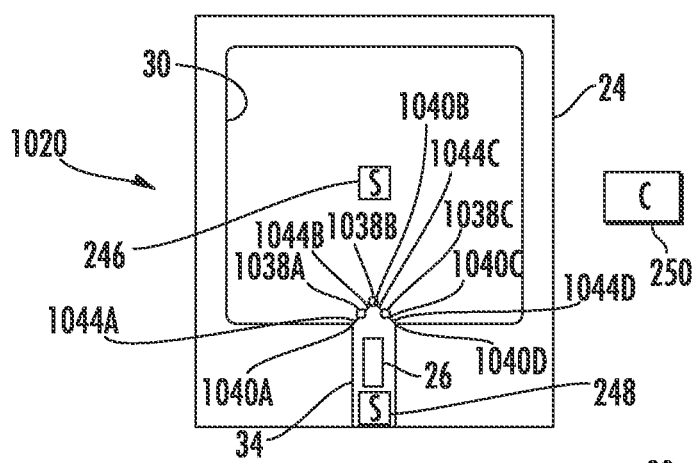
FIG. 13 is a schematic diagram of another example microfluidic valve.

FIG. 13 schematically illustrates another example microfluidic valve 1020. Microfluidic valve 1020 is similar to microfluidic valve 220 described above except that microfluidic valve 1020 comprises pillars 1038A, 1038B and 1038C (collectively referred to as pillars 1038). Those remaining components of valve 1020 which correspond to components of valve 220 are numbered similarly.

Pillars 1038 comprise posts extending between portion 34 and portion 30. Pillar 1038A cooperates with the conduit 24 to form constriction 1040A across which a capillary meniscus 1044A may form in the presence of a liquid-gas interface across constriction 1040A. Pillar 1038B cooperates with the pillar 1038A to form constriction 1040B across which a capillary meniscus 1044B may form in the presence of a liquid-gas interface across constriction 1040B. Pillar 1038C cooperates with the pillar 1038B to form constriction 1040C across which a capillary meniscus 1044C may form in the presence of a liquid-gas interface across constriction 1040C. Pillar 1038C cooperates with the conduit 24 to form constriction 1040D across which a capillary meniscus 1044D may form in the presence of a liquid-gas interface across constriction 1040D.

Constrictions 1040 are in parallel with one another. Constrictions 1040 facilitate a reduction in size of such constrictions to increase the individual burst pressure thresholds of each of the individual capillary menisci that form across such constrictions 1040 while providing a collectively large area through which fluid liquid may flow once valve 1020 has been opened. In one implementation, each of pillars 1038 has a diameter of 10 μm, wherein each of constrictions 1040 is bordered by opposite gaps with each gap having width of 6 μm. In other implementations, pillars 1038 and their associated gaps may have other dimensions.

Figure 14A:
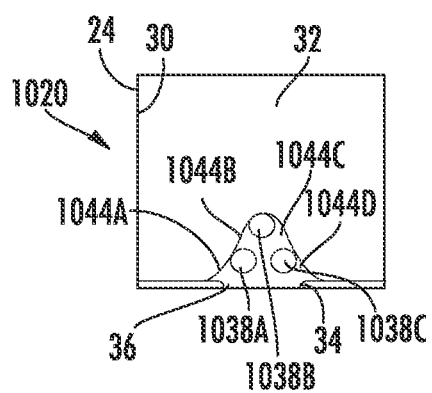
FIGS. 14A, 14B and 14C are enlarged schematic diagrams of portions of the microfluidic valve of FIG. 13, illustrating opening of the valve.
Figure 14B:
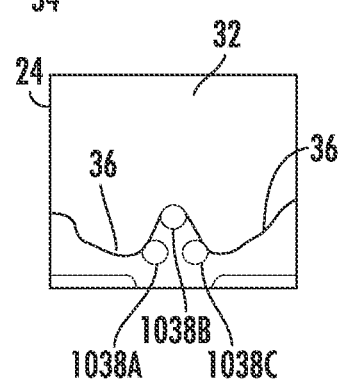
Figure 14C:
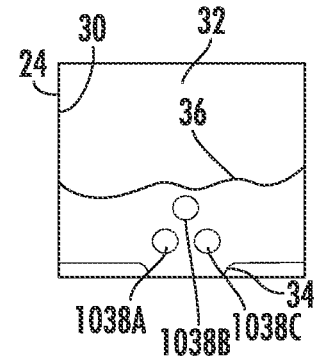

FIGS. 14A-14C illustrate the opening of valve 1020. FIG. 14A illustrates valve 1020 in a closed state in which capillary menisci 1044 have formed across the respective constrictions or gaps between portions 30 and 34. FIG. 14B illustrates valve 1020 initially after actuation of drop jetting device 26 (shown in FIG. 13). In one implementation, FIG. 14B illustrates valve 1020 20 μs after actuation of drop jetting device 26. As shown by FIG. 14B, capillary menisci 1044A and 1044D have been burst, wherein liquid 36 (water in the example illustrated) is being jetted towards and on the sidewalls of portion 30. As shown by FIG. 14C, valve 1020 has attained an open state in which liquid 36 is flowing into and filling portion 30. Repetitive actuation or firing of drop jetting device 26 may further assist in filling portion 30 with liquid 36.

FIG. 15 illustrates another example microfluidic valve 1120. Microfluidic valve 1120 is similar to microfluidic valve 420 described above except that microfluidic valve 1120 additionally comprises pillar 1170. Those remaining components of valve 1120 which correspond to components of valve 420 are numbered similarly.

Pillar 1170 comprises a column or post extending within portion 30 of microfluidic conduit 424. Pillar 1170 extends generally opposite to constriction 440 and is spaced from constriction 440 by distance greater than the width of constriction 440 such that a capillary meniscus does not generally form and extend from pillar 1170. In one implementation, pillar 1170 is spaced from constriction 440 by distance of at least 50 um but no greater than 200 um. Pillar 1170 provides a surface against which liquid flowing through constriction 440 may deposit. Pillar 1170 may inhibit the reformation of a capillary meniscus across constriction 440 and may facilitate faster opening of valve 1120.

FIGS. 16A-16C illustrate one example of valve 1120 being opened. FIG. 16A illustrates valve 1120 in a closed state in which a capillary meniscus 444 has formed across the constriction 440 between portions 30 and 34. FIG. 16B illustrates valve 1120 initially after actuation of drop jetting device 26 (shown in FIG. 15). In one implementation, FIG. 16B illustrates valve 1120 20 μs after actuation of drop jetting device 26. As shown by FIG. 16B, capillary meniscus 36 has been burst, wherein liquid 36 (water in the example illustrated) is being jetted towards and onto pillar 1170. As shown by FIG. 16C, valve 1120 has attained an open state in which liquid 36 is flowing into and filling portion 30. Repetitive actuation or firing of drop jetting device 26 may further assist in filling portion 30 with liquid 36.

FIG. 17 illustrates another example microfluidic valve 1220. Microfluidic valve 1220 is similar to valve 720 described above except that valve 1220 additionally comprises pillar 1270 described above. Those remaining components of valve 1220 which correspond to components of valve 720 are numbered similarly.

Pillar 1270 comprises a column or post extending within portion 30 of microfluidic conduit 724. Pillar 1270 extends generally opposite to constriction 740 and is spaced from constriction 740 by distance greater than the width of constriction 740 such that a capillary meniscus does not generally form and extend from pillar 1270. In one implementation, pillar 1270 is spaced from constriction 740 by distance of at least 50 um but no greater than 200 um. Pillar 1270 provides a surface against which liquid flowing through constriction 740 may deposit.

FIG. 18 illustrates valve 1220 after meniscus 744 has been burst, wherein liquid 36 (water in the example illustrated) is being jetted towards and onto pillar 1270. As shown by FIG. 18, valve 1220 has attained an open state in which liquid 36 is flowing into and filling portion 30. Repetitive actuation or firing of drop jetting device 26 may further assist in filling portion 30 with liquid 36. As shown by FIG. 18, pillar 1270 may inhibit the reformation of a capillary meniscus across constriction 740 and may facilitate faster opening of valve 1220.

FIG. 19 illustrates another example microfluidic valve 1320. Microfluidic valve 1320 is similar to valve 620 described above except that valve 1320 additionally comprises pillar 1370 described above. Those remaining components of valve 1320 which correspond to components of valve 620 are numbered similarly.

Pillar 1370 comprises a column or post extending within portion 30 of microfluidic conduit 624. Pillar 1370 extends generally opposite to constriction 640 and is spaced from constriction 640 by distance greater than the width of constriction 640 such that a capillary meniscus does not generally form and extend from pillar 1370. In one implementation, pillar 1370 is spaced from constriction 640 by distance of at least 50 um but no greater than 200 um. Pillar 1370 provides a surface against which liquid flowing through constriction 640 may deposit.

FIG. 20 illustrates valve 1320 after meniscus 644 has been burst, wherein liquid 36 (water in the example illustrated) is being jetted towards and onto pillar 1370. As shown by FIG. 20, valve 1320 has attained an open state in which liquid 36 is flowing into and filling portion 30. Repetitive actuation or firing of drop jetting device 26 may further assist in filling portion 30 with liquid 36. As shown by FIG. 20, pillar 1370 may inhibit the reformation of a capillary meniscus across constriction 640 and may facilitate faster opening of valve 1320.

Figure 21:
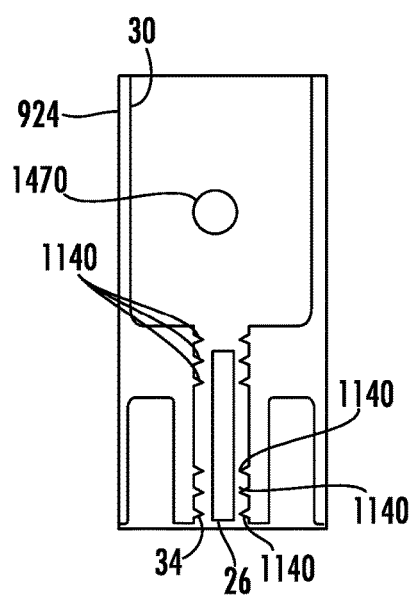
FIG. 21 is a diagram of another example microfluidic valve.

FIG. 21 illustrates another example microfluidic valve 1420. Valve 1420 is similar to microfluidic valve 920 described above except that valve 1420 additionally comprises pillar 1470 and two spaced sets of constrictions 1140A, 1140B and 1140C (collectively referred to as restrictions 1140) within portion 34. Those remaining components of belt 1420 which correspond to valve 920 are numbered similarly.

Pillar 1470 is similar to pillars 1170, 1270 and 1370 described above in that pillar 1470 is located within portion 30 of conduit 1424 so as to provide a surface against which a jetted stream of liquid may contact such that stream of liquid does not break off a new capillary meniscus does not form.

Constrictions 1140 are arranged in two sets spaced along portion 34. Constrictions 1140 are provided by teeth which are spaced along portion 34 and which extends opposite to one another in opposite sides of portion 34. Constrictions 1140 provide additional location at which capillary menisci may sequentially form to reduce a likelihood of valve 1420 inadvertently opening in response to fluctuations in pressure in the fluid within portion 34 on an opposite side of a capillary meniscus and gas extending from portion 30 into portion 34. In the example illustrated, valve 1420 comprises two sets of three constrictions along portion 34. In other implementations, valve 1420 may comprise a greater or fewer of such sets. In other implementations, such sets of conditions may include a lesson or more than three serially arranged constrictions.

Figure 22:
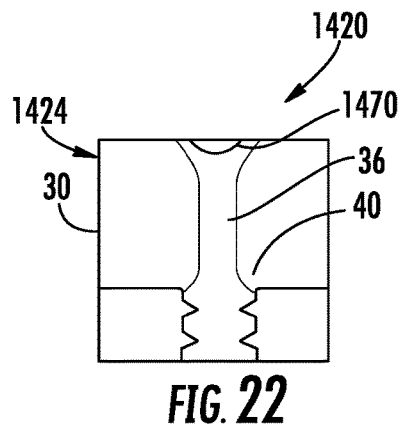
FIG. 22 is an enlarged view of a portion of the microfluidic valve of FIG. 21 during opening of the valve.

FIG. 22 illustrates opening of valve 1420. FIG. 22 illustrates belt 1420 after drop jetting device 26 has been fired with a sufficient intensity or a sufficient number of times so as to break any and all capillary menisci such that liquid within portion 34 is jetted into portion 30. The jetted liquid impacts post 1470 to form a continuous stream from constriction 40 to post 1470. This continuous stream may enlarge and expand so as to fill portion 30 of conduit 1420.

Figure 23:
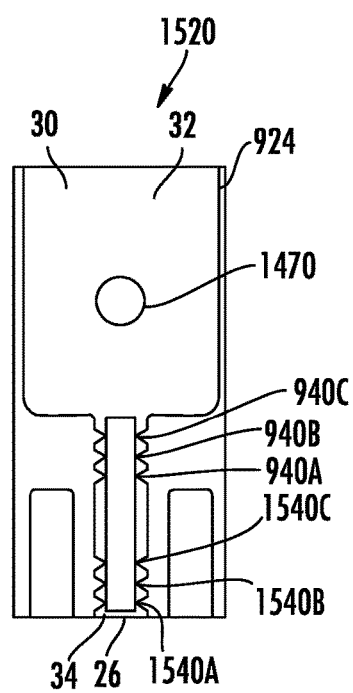
FIG. 23 is a diagram of another example microfluidic valve.

FIG. 23 illustrates another example microfluidic valve 1520. Microfluidic valve 1520 is similar to microfluidic valve 1420 except that microfluidic valve 1520 comprises two sets of constrictions, constrictions 940 and constrictions 1540. Constrictions 1540A, 1540B and 1540C (collectively referred to as constrictions 1540) are similar to constrictions 1140 described above except that constrictions 1540 are formed by consecutive teeth which extend end-to-end, abutting one another along each side of portion 34, wherein the teeth extend opposite to one another on opposite sides of portion 34. Constrictions 1540 provide additional location at which capillary menisci may sequentially form to reduce a likelihood of valve 1520 inadvertently opening in response to fluctuations in pressure in the fluid within portion 34 on an opposite side of a capillary meniscus and gas extending from portion 30 into portion 34. In the example illustrated, valve 1520 comprises two sets of three constrictions along portion 34. In other implementations, valve 1520 may comprise a greater or fewer of such sets. In other implementations, such sets of conditions may include a lesson or more than three serially arranged constrictions.

Figure 24:
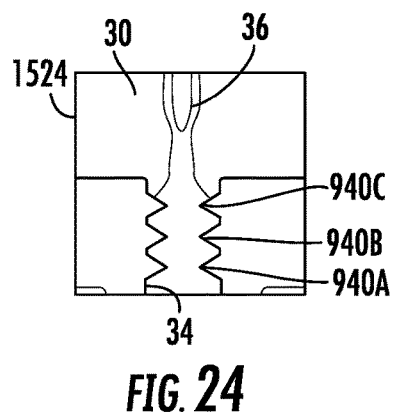
FIG. 24 is an enlarged view of a portion of the microfluidic valve of FIG. 23 during opening of the valve.

FIG. 24 illustrates opening of valve 1520. FIG. 24 illustrates valve 1520 after drop jetting device 26 has been fired with a sufficient intensity or a sufficient number of times so as to break any and all capillary menisci such that liquid within portion 34 is jetted into portion 30. The jetted liquid impacts post 1470 to form a continuous stream from constriction 40 to post 1470. This continuous stream may enlarge and expand so as to fill portion 30 of conduit 1520.

Figure 25:
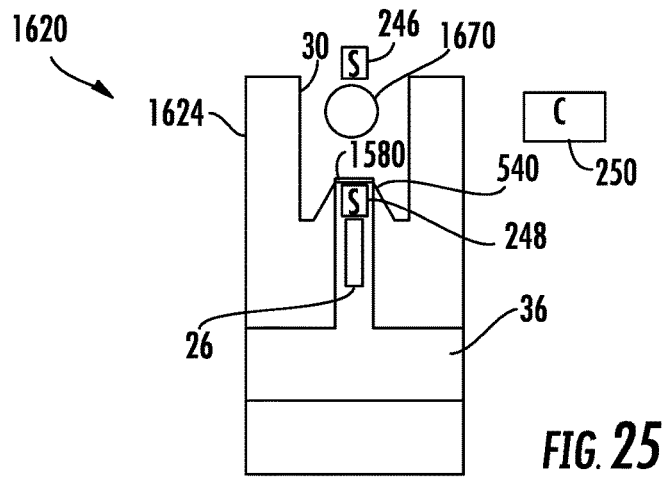
FIG. 25 is a schematic diagram of another example microfluidic valve.

FIG. 25 illustrates another example microfluidic valve 1620. Microfluidic valve 1620 is similar to microfluidic valve 520 except that microfluidic valve 1620 additionally comprises pillar 1670 and viscous plug 1580. Those remaining components of valve 1620 which correspond to the 520 are numbered similarly.

Pillar 1670 is similar to pillar 1170, 1270, 1370 and 1470 described above. Pillar 1670 pillar 1470 is located within portion 30 of conduit 1424 so as to provide a surface against which a jetted stream of liquid may contact such that stream of liquid does not break off a new capillary meniscus does not form. In other implementations, pillars 1670 may be omitted.

Viscous plug 1580 comprises a film or layer that extends across constriction 540, closing constriction 540 and valve 1620. In one implementation, viscous plug 1580 comprises particles within liquid 36, wherein the particles gather at a capillary meniscus formed across constriction 540 to form a film that serves as plug 1580. Plug 1580 may have an enhanced burst pressure threshold as compared to a capillary meniscus across constrictions 540 lacking such a plug 1580. Plug 1580 may further form a layer that reduces the rate at which liquid 36 is evaporated at the liquid-gas interface across constriction 540. In one implementation, plug 1580 may be formed from a chemical, such as a surfactant within liquid 36.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A microfluidic valve comprising:
   a first portion of a liquid conduit to contain a gas, the first portion including a sensor to detect a flow of a liquid;
   a second portion of a liquid conduit to contain the liquid;
   a constriction between the first portion and the second portion and across which a capillary meniscus is to form between the gas and the liquid, wherein the constriction is an interface where the liquid conduit undergoes dimensional changes from a larger flow passage to a smaller flow passage and the constriction includes:
   a first side wall parallel to a direction of the flow of the liquid,
   a second side wall parallel to the first side wall, and
   a pillar disposed within the liquid conduit at a location between the first side wall and the second side wall, wherein the pillar extends into the first portion of the liquid conduit;
   a drop jetting device within the second portion proximate to the constriction to open the microfluidic valve by breaking the capillary meniscus across the constriction, wherein the drop jetting device includes a resistive element;
   a controller to activate the drop jetting device based upon signals from the sensor to break the capillary meniscus across the constriction and in response to the break of the capillary meniscus, to provide continuous flow of the liquid to the first portion from the second portion of the liquid conduit; and
   a spout which forms the constriction and part of the second portion and provides an outlet of the second portion to the first portion, the spout having an end projecting into the interior of the first portion to locate the constriction within the first portion, and wherein the drop jetting device is disposed within a portion of the interior of the spout.

2. The microfluidic valve of claim 1, wherein the drop jetting device comprises a thermal resistor and the controller is to activate the drop jetting device to fire and, in response to the drop jetting device firing, to break the capillary meniscus across the constriction and to provide flow of the liquid through the first portion and the second portion of the liquid conduit without interruption in response to the activation of the drop jetting device, wherein the pillar is disposed within the first portion of the liquid conduit and with gaps between pillar and the first side wall and the second side wall.

3. The microfluidic valve of claim 1, wherein the end is tapered about the constriction, and the spout further includes a main portion, a jetting portion, and a constricting portion with a cross-sectional area that reduces from the main portion to the jetting portion, the jetting portion coupled to or including the end projecting into the interior of the first portion.

4. The microfluidic valve of claim 1, wherein the constriction is a first constriction, the microfluidic valve further comprising a second constriction in the second portion in series with the constriction, wherein the second constriction has a reduced cross-sectional area as compared to the first constriction.

5. The microfluidic valve of claim 4, further comprising a third constriction in the second portion in series with the first constriction and the second constriction, wherein the third constriction has a reduced cross-sectional area as compared to the first constriction and the second constriction.

6. The microfluidic valve of claim 1, wherein the pillar forms the constriction on a first side of the pillar and forms a second constriction on a second side of the pillar and across which a second capillary meniscus is to form between the gas and the liquid.

7. The microfluidic valve of claim 6, wherein the second constriction faces a perimeter of the first portion of the liquid conduit.

8. The microfluidic valve of claim 1, wherein the pillar is within the first portion and spaced from the constriction so as to be impacted by the liquid passing through the constriction upon breaking of the capillary meniscus, and further including gaps between pillar and the first side wall and the second side wall.

9. The microfluidic valve of claim 1, further comprising a viscous plug across the constriction.

10. The microfluidic valve of claim 1, wherein the sensor is a wet-dry sensor and wherein:
the controller is to activate the drop jetting device to fire and, in response to the drop jetting device firing, to break the capillary meniscus across the constriction and to permit the flow of liquid into and to fill the first portion of the liquid conduit with the liquid.

11. The microfluidic valve of claim 1, wherein the sensor is a first sensor, the microfluidic valve further including a second sensor disposed in the second portion, and the controller to activate the drop jetting device based upon signals from the first sensor and the second sensor.

12. The microfluidic valve of claim 1, wherein the sensor is a first sensor comprising a wet-dry sensor, the microfluidic valve further including a second sensor comprising an impedance sensor.

13. A microfluidic valve comprising:
a first portion of a liquid conduit to contain a gas, the first portion including a sensor to detect a flow of a liquid;
a second portion of a liquid conduit to contain the liquid;
a constriction between the first portion and the second portion and across which a capillary meniscus is to form between the gas and the liquid, wherein the constriction is an interface where the liquid conduit undergoes dimensional changes from a larger flow passage to a smaller flow passage and the constriction includes:
a first side wall parallel to a direction of the flow of the liquid,
a second side wall parallel to the first side wall, and
a pillar disposed within the liquid conduit at a location between the first side wall and the second side wall, wherein the pillar extends into the first portion of the liquid conduit;
a drop jetting device within the second portion proximate to the constriction to open the microfluidic valve by breaking the capillary meniscus across the constriction, wherein the drop jetting device includes a resistive element;
a controller to activate the drop jetting device based upon signals from the sensor to break the capillary meniscus across the constriction and in response to the break of the capillary meniscus, to provide continuous flow of the liquid to the first portion from the second portion of the liquid conduit; and
a second constriction between the first portion and the second portion in parallel with the constriction.

14. A microfluidic valve comprising:
a liquid conduit including a first portion to contain a gas, a second portion to contain a liquid, a first side wall parallel to a direction of flow of a liquid, and a second side wall parallel to the first side wall, wherein the liquid conduit includes a plurality of constrictions in series along a microfluidic conduit, each of the plurality of constrictions being sized such that a capillary meniscus forms at a gas-air interface existing at one of the constrictions and is an interface where the liquid conduit undergoes dimensional changes from a larger flow passage to a smaller flow passage, and wherein each of the constrictions is provided by a plurality of teeth disposed along the first side wall and along the second side wall and are disposed within the second portion of the liquid conduit;
at least one drop jetting device positioned proximate to the plurality of constructions to break the capillary meniscus, wherein the drop jetting device includes a resistive element;
a controller to activate the drop jetting device based upon signals from a sensor disposed within the microfluidic valve to break the capillary meniscus and in response to the break of the capillary meniscus, to provide continuous flow of the liquid to the first portion from the second portion of the liquid conduit; and
a spout which forms a constriction and part of the second portion and provides an outlet of the second portion to the first portion, the spout having an end projecting into the interior of the first portion to locate the constrictionformed by the spout within the first portion, and wherein the at least one drop jetting device is disposed within a portion of the interior of the spout.

15. The microfluidic valve of claim 14, wherein the constrictions include a first plurality of constrictions and a second plurality of constrictions, wherein the first plurality of constrictions are spaced apart from the second plurality of constrictions, and wherein the at least one drop jetting device includes a drop jetting device disposed between each of the constrictions.

16. The microfluidic valve of claim 14, wherein the first portion includes the sensor to detect the flow of the liquid.

* * * * *